(12) United States Patent
Temple

(10) Patent No.: US 6,402,278 B1
(45) Date of Patent: Jun. 11, 2002

(54) DROP-ON-DEMAND MULTI-TONE PRINTING

(75) Inventor: Stephen Temple, Science Park (GB)

(73) Assignee: Xaar Technology Limited, Cambridge (GB)

(*) Notice: Subject to any disclaimer, the term of this patent is extended or adjusted under 35 U.S.C. 154(b) by 0 days.

(21) Appl. No.: 09/515,194

(22) Filed: Feb. 29, 2000

Related U.S. Application Data

(63) Continuation of application No. PCT/GB98/02687, filed on Sep. 7, 1998.

(30) Foreign Application Priority Data

Sep. 8, 1997 (GB) .............................. 9719071

(51) Int. Cl.$^7$ .............................. B41J 29/38; B41J 2/135
(52) U.S. Cl. .............................. 347/12; 347/10; 347/11; 347/46
(58) Field of Search .............................. 347/9–12, 46, 347/69

(56) References Cited

U.S. PATENT DOCUMENTS

| | | | |
|---|---|---|---|
| 4,251,823 A | 2/1981 | Sagae ..................... | 347/12 |
| 4,887,100 A | 12/1989 | Michaelis et al. ............ | 347/69 |
| 5,266,965 A | 11/1993 | Komai et al. ................. | 347/12 |
| 5,767,871 A * | 6/1998 | Imai .............................. | 347/10 |
| 5,797,779 A * | 8/1998 | Nakayasu et al. ............ | 347/46 |
| 6,045,209 A * | 4/2000 | Imai .............................. | 347/11 |
| 6,123,412 A * | 9/2000 | Yamamoto et al. ........... | 347/46 |

FOREIGN PATENT DOCUMENTS

| | | | |
|---|---|---|---|
| EP | 0 422 870 A2 | 4/1991 | B41J/2/045 |
| WO | WO 92/06848 | 4/1992 | B41J/2/205 |
| WO | WO 96/10488 | 4/1996 | B41J/2/21 |

* cited by examiner

Primary Examiner—John Barlow
Assistant Examiner—Alfred E. Dudding
(74) Attorney, Agent, or Firm—Marshall, Gerstein & Borun

(57) ABSTRACT

A drop-on-demand multi-tone printing apparatus has a series of channels arranged to receive ink from a source. Each channel has a respective ink outlet. Each adjacent pair of the channels is separated by a respective dividing wall, and each dividing wall is movable in response to a respective pulsed electrical signal to apply pressure pulses to the respective pair of the channels, whereby ink can be ejected from the outlets and deposited onto a recording medium. A respective pulsed electrical signal is developed for each channel in dependence upon whether ink is to be ejected from that channel, the signals for adjacent pairs of the channels temporally overlapping each other and not being in phase with each other.

14 Claims, 5 Drawing Sheets

DROP-ON-DEMAND MULTI-TONE PRINTING

CROSS-REFERENCE TO RELATED APPLICATION

This is a continuation of International Application No. PCT/GB98/02687 filed Sep. 7, 1998, the entire disclosure of which is incorporated by reference.

This invention relates to drop-on-demand multi-tone printing.

In particular, a first aspect of the present invention relates to a method of operating a drop-on-demand multi-tone printing apparatus having a series of channels arranged to receive ink from a source, each channel having a respective ink outlet (usually, an appropriately shaped and dimensioned nozzle), each adjacent pair of the channels being separated by a respective dividing wall, and each dividing wall being movable in response to a pulsed electrical signals (for example using the piezo-electric effect) to apply pressure pulses to the ink in the respective pair of the channels, whereby ink can be ejected from the outlets and deposited onto a recording medium.

A problem with operating such an apparatus is that the signal applied to each dividing wall affects both of the channels to either side of that dividing wall. Patent document WO-A-96/10488 describes ways of dealing with this problem.

In one example described in WO-A-96/10488, printing of a line of pixels is divided into three cycles. In the first cycle, the dividing walk to either side of channels numbered, for example, 1, 4, 7, . . . are driven (if ink is to be ejected from them) with a pulsed signal. In the second cycle, the dividing walls to either side of channels numbered 2, 5, 8, . . . are driven (if ink is to be ejected from them) with the pulsed signal. In the third cycle, the dividing war's to either side of channels numbered 3, 6, 9, . . . are driven (if ink is to be ejected from them) with the pulsed signal. Thus, the pressure pulses developed in the channels which are not included in the current cycle are no greater than ½ of those in the channels which are intended to eject ink. The printing apparatus is arranged so that such ½ magnitude pulses do not cause ink ejection.

In another example described in WO-A-96/10488, printing of a line of pixels is divided into two cycles. In the first cycle, the dividing walls to either side of channels numbered 1, 5, 9, . . . , for example, are driven (if ink is to be ejected from them) with a first pulsed signal, and the dividing walls to either side of channels 3, 7, 11, . . . are driven (if ink is to be ejected from them) with a second pulsed signal which is $\pi$ radians out-of-phase with the first pulsed signal. If the dividing walls to either side of the odd-numbered channels are all driven, then the resultant pressure pulses applied to the even-numbered channels are zero. If the dividing walls to either side of only some of the odd-numbered channels are driven, then the resultant pressure pulses applied to the even-numbered channels can be no more than ½ of the magnitude of those applied to the intended channels. Again, the printing apparatus is arranged so that such ½ magnitude pulses do not cause ink ejection. Conversely, in the second cycle, the dividing walls to either side of channels numbered 2, 6, 10, . . . , for example, art driven (if ink is to be ejected from them) with the first pulsed signal, and the dividing walls to either side of channels 4, 8, 12, . . . are driven (if ink is to be ejected from them) with the second pulsed signal which is $\pi$ radians out-of-phase with the first pulsed signal.

A problem with the driving schemes described above is that the requirement for ⅔ or ½ of the channels not to be printing at any time means that the speed of printing is not as high as might be desired.

In accordance with the first aspect of the invention, the method of operating such an apparatus comprises the steps of: developing for each channel a respective pulsed electrical signal in dependence upon whether ink is to be ejected from that channel, the signals for adjacent pairs of the channels temporally overlapping each other and not being in phase with each other; and applying to each dividing wall a combination of the signals developed for the respective pair of the channels.

It might be expected that with such a method of operation, unwanted ink ejection will occur. However, as will be apparent from the following description, on the whole, the method enables no more than ½ size pulses to be applied to channels which are not intended to eject ink. When a particular channel is intended to eject, and one of its adjacent channels is also, but the other adjacent channel is not, then the middle channel may be subjected to pulses which are slightly greater than normal, slightly distorted and/or slightly phase-shifted compared with normal, but these effects can be arranged so that they are not significant. The method of this aspect of the invention enables ink to be ejected, when necessary, from all of the outlets at the same time, and thus the printing speed can be high.

Preferably, the channels are arranged in groups each containing a number $X (X \geq 3$, for example four) of the channels, the signals developed for adjacent pairs of the channels being generally $2\pi n/X$ radians out of phase with each other, where n is an integer not equal to X. Thus, there is a substantially constant phase shift between one channel and the next. Preferably n and X have no common factors.

Preferably, for each dividing wall, the applying step comprises the steps of: applying the signal developed for the channel to one side of that dividing wall to an electrode on that side of the dividing wall; and applying the signal developed for the channel to the other side of that dividing wall to an electrode on that other side of the dividing wall.

Preferably, lines of pixels of the ink are deposited onto the recording medium in respective cycles; and, in each cycle, those of the channels which are to eject ink in that cycle begin ejection at the beginning of the cycle and continue ejection until part-way through, or the end of, the cycle. The effect of this is that, if there is a slight phase-shift when, as described above, a particular channel is ejecting, and one of its adjacent channels is also, but the other adjacent channel is not, two such phase shifts in opposite directions will not occur for a single channel in succession.

The signals developed for each channel may be generally square-wave signals or generally sinusoidal.

In accordance with a second aspect of the present invention, there is provided a drop-on-demand multi-tone printing apparatus, comprising: a series of channels arranged to receive ink from a source, each channel having a respective ink outlet, each adjacent pair of the channels being separated by a respective dividing wall, and each dividing wall being movable in response to a pulsed electrical signals to apply pressure pulses to the ink in the respective pair of the channels, whereby ink can be ejected from the outlets and deposited onto a recording medium; means for developing for each channel a respective pulsed electrical signal in dependence upon whether ink is to be ejected from that channel, the signals for adjacent pairs of the channels temporally overlapping each other and not being in phase with each other; and means for applying to each dividing wall a combination of the signals developed for the respective pair of the channels.

The printing apparatus may be provided with various features so as to perform the preferred steps of the method described above.

A specific embodiment of the present invention will now be described, purely by way of example, with reference to the accompanying drawings, in which.

Figure 1:
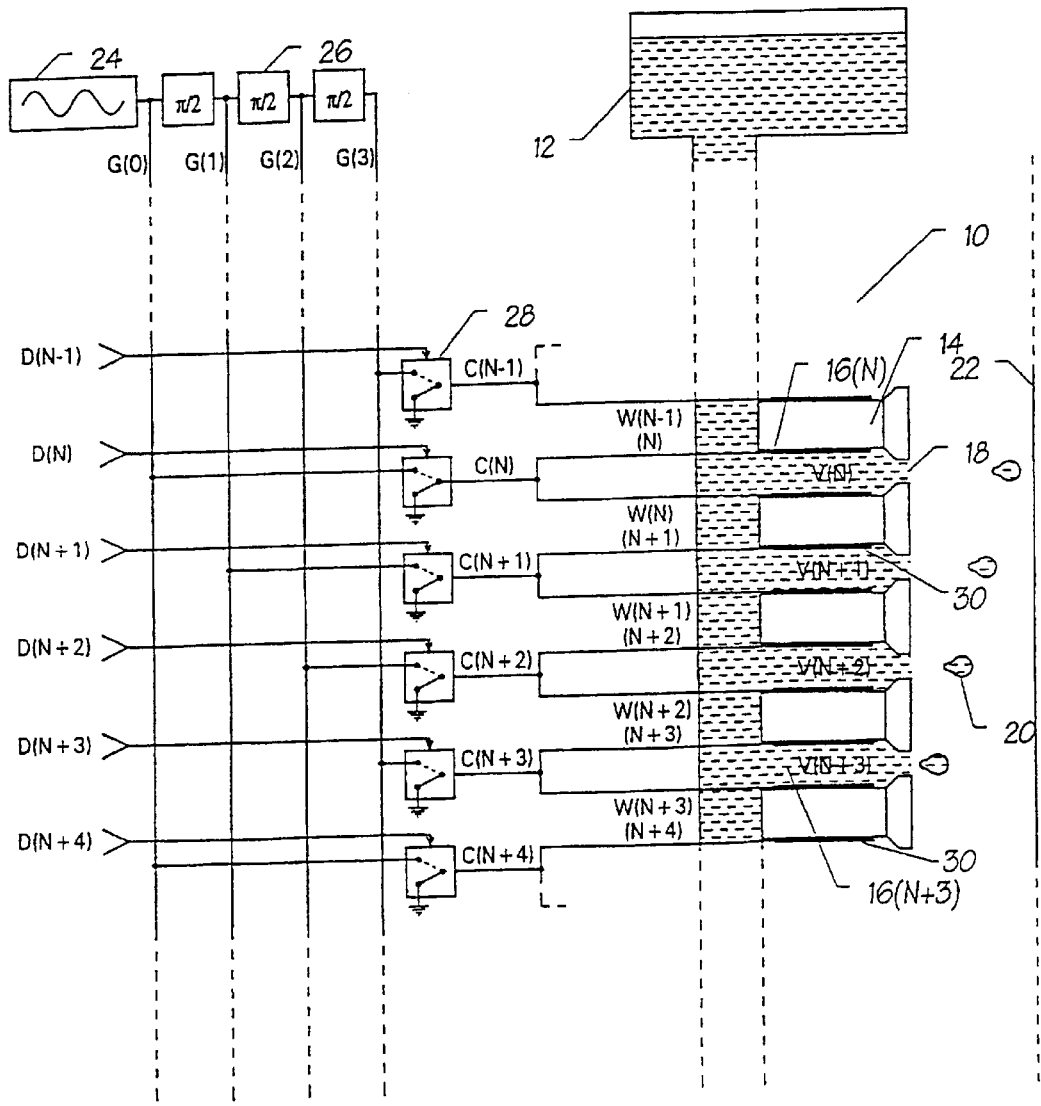
FIG. 1 is a schematic drawing of part of a printing apparatus.

Referring to FIG. 1, a drop-on-demand multi-tone printing apparatus comprises a print head 10, part of which is shown in the drawing, which is fed from an ink reservoir 12. The print head 10 has a series of parallel walls 14, which define between them a series of parallel channels 16. As viewed in the FIG. 1, the left end of each channel 16 communicates with the ink reservoir 12, and a nozzle 18 is provided at the right end of each channel 16. Each wall 14 is formed of a piezo-electric material oriented so that when an electric field of one polarity is applied to it the wall 14 distorts so as to reduce the volume of the channel to one side of it and to increase the volume of the channel on the other side of it. Conversely, when an electric field of the opposite polarity is applied, the wall 14 distorts so as to increase the volume of the channel on the one side and to decrease the volume of the channel on the other side. The changes in volume produce pressure changes in the ink, so by applying streams of pulsiform signals to the walls 14, pressure pulses can be generated in the channels, causing streams of droplets 20 of ink to be ejected from the nozzles 18 towards a recording medium 22 such as a sheet of paper. By varying the lengths of the stream of pulses, the number of droplets which are ejected can be varied, so as to perform multi-tone printing. Once a line of pixels of ink has been deposited on the paper 22, the print head 10 and paper 22 are moved relative to each other in the direction perpendicular to the plane of the drawing of FIG. 1, and a further line of pixels of ink can then be deposited. Alternatively, this relative movement may be continuous. The arrangement as described so far with reference to FIG. 1 is known, for example from patent documents WO-A-95/25011 and WO-A-96/10488.

Figure 2:
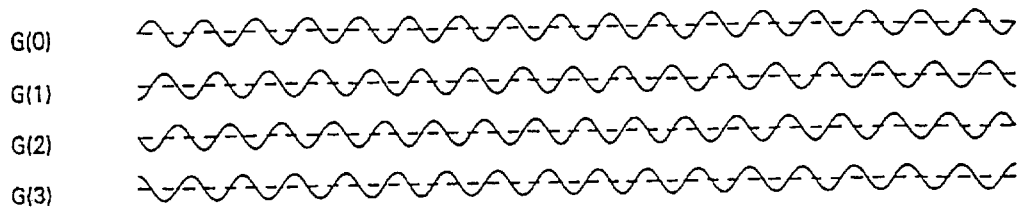
FIG. 2 illustrates various sinusoidal signal waveforms produced in the apparatus of FIG. 1.

As shown also in FIG. 1, a sine wave generator 24 is provided, which produces a signal G(0). This is fed to a series of three quarter-wave delay circuits 26 to produce signals G(1), G(2) and G(3) which phase lag the signal G(0) by $\pi/2$, $\pi$ and $3\pi/2$ radians, respectively, as shown in FIG. 2.

In FIG. 1, only four of the channels 16 are shown, and the channels have respective data inputs receiving binary signals D(N), D(N+1), D(N+2) and D(N+3). (For completeness, two other data inputs receiving binary signals D(N−1) and D(N+4) are also shown.) The signal D(N) is used to control a switch 28 to produce a signal C(N) which is equal to the signal D(N) or is grounded, in dependence upon the logical state of the signal D(N). Similarly, the signals G(1), G(2), G(3) are switched by respective switches 28 under control of the signals D(N+1), D(N+2), D(N+3) to produce signals C(N+1), C(N+2) and C(N+3), respectively. This connection arrangement is repeated for every four input signals, e.g D(N+4) to D(N+7), D(N+8) to D(N+11), and so on. Each signal C(i) is applied to a pair of electrodes 30 on the piezo-electric war's 14 to either side of its respective channel 16(i). The potential difference W(i−1)(i) across each wall 14 between an adjacent pair of the channels 16(i−1), 16(i) is given by $$W(i-1)(i)=C(i)-C(i-1) \qquad \text{equation 1.}$$

The change in volume of a channel 16(i) caused by the applied signals is denoted in the drawings as V(i) and is proportional to the net displacement of the walls bounding the 10 channel. The displacement of each wall is generally proportional to the potential difference across it. Hence, if the constant of proportionality is assumed to be unity, $$V(i)=W(i)(i+1)-W(i-1)(i) \qquad \text{equation 2}$$

Figure 3:
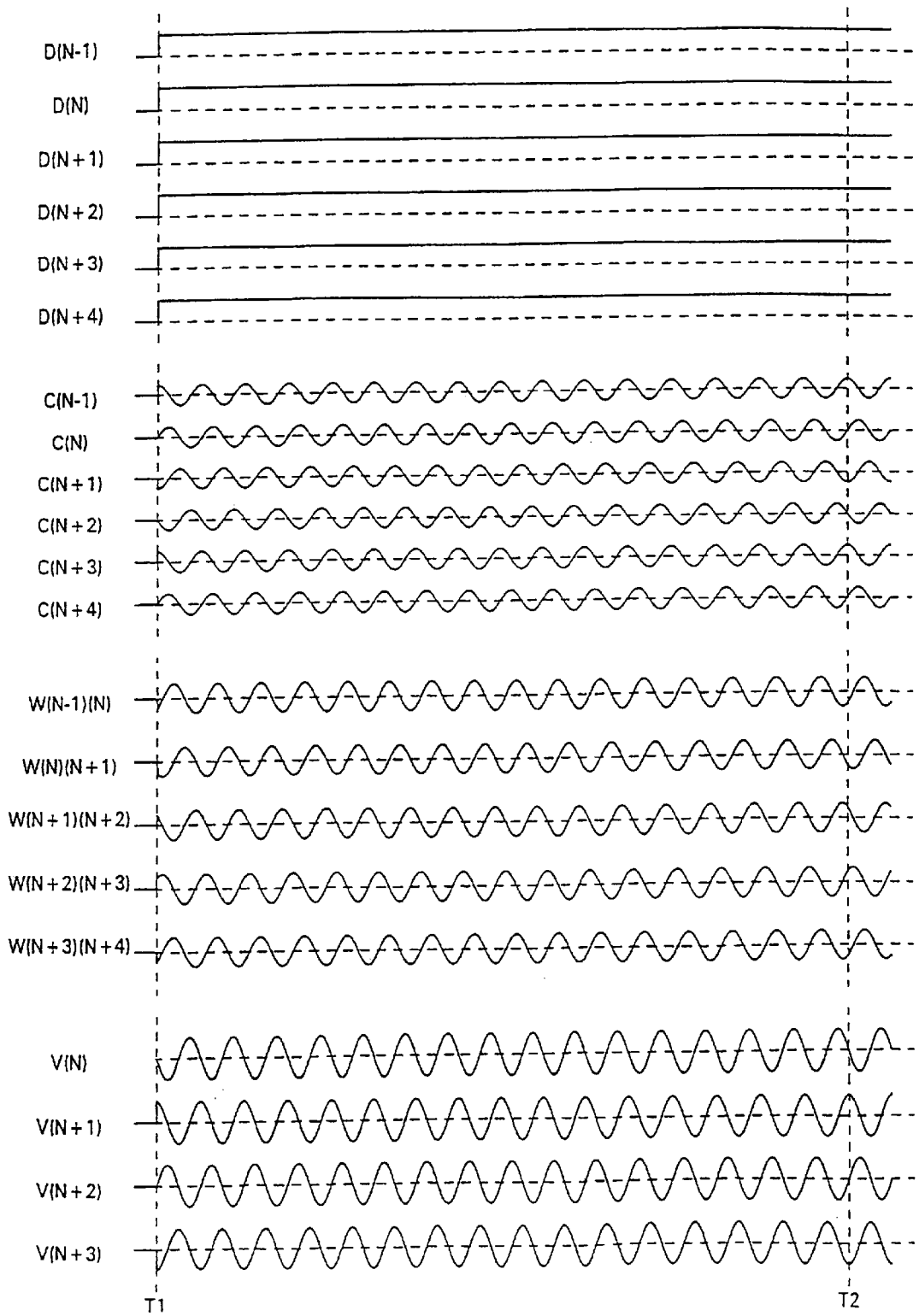
FIG. 3 illustrates various signal waveforms produced in the apparatus when depositing the maximum amount of ink.

FIG. 3 of the drawings show the above-mentioned signals plotted with a time abscissa in the case where all of the input signals D(i) have a logic level of 1 so as to print a line of maximum density on the paper 22. As can be seen, the change of volume waveforms V(i) are regular sinusoidal waves, and thus even injection of the droplets 20 is produced.

Figure 4:
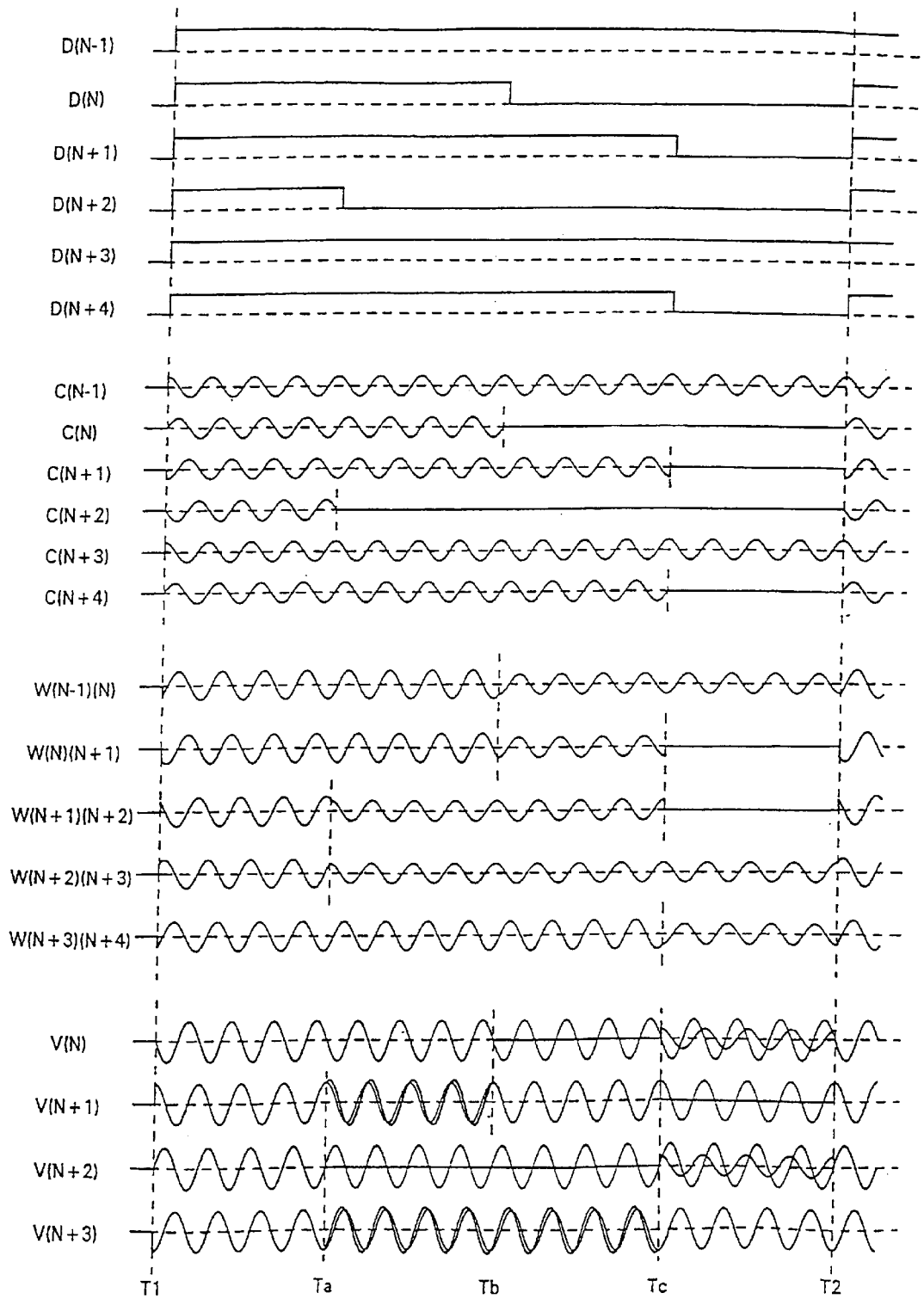
FIG. 4 illustrates various signal waveforms produced in the apparatus during an example of multi-tone printing.

FIG. 4 illustrates the case where, in a cycle between time T1 and time T2, the channels 16(N−1) and 16(N+3) are intended to eject droplets 20 for the complete cycle T1 to T2, the channels 16(N+1) and 16(N+4) are intended to eject droplets 20 for the first three-quarters of the cycle T1 to Tc, the channel 16(N) is intended to eject droplets 20 for the first half of the cycle T1 to Tb, and the channel 16(N+2) is intended to eject droplets 20 for the first quarter of the cycle T1 to Ta. In FIG. 4, the actual volume change waveforms V(N) to V(N+3) are shown in bold, and the waveforms of FIG. 3, where different, are overlaid as feint traces so that a comparison can be easily made.

As can be seen, the volume changes V(N) in the channel 16(N) are, during the first half of the cycle T1 to Tb, similar to those shown in FIG. 3 and cause a stream of droplets 20 to be ejected. In the third quarter of the cycle Tb to Tc, there are no volume changes in the channel 16(N), and so no droplets 20 are ejected. In the fourth quarter of the cycle Tc to T2, the volume changes in the channel 16(N) have a 50% magnitude, and are insufficient to cause any droplets 20 to be ejected.

The volume changes V(N+1) during the second quarter of the cycle Ta to Tb in the channel 16(N+1), and the volume changes V(N+3) during the second and third quarters of the cycle Ta to Tc in the channel 16(N+3) will now be discussed.

From equations (1) and (2) above, it follows (assuming constants of proportionality of unity) that $$V(N+1)=C(N+2)-(2 \times C(N+1))+C(N) \qquad \text{equation 3.}$$

Figure 5:
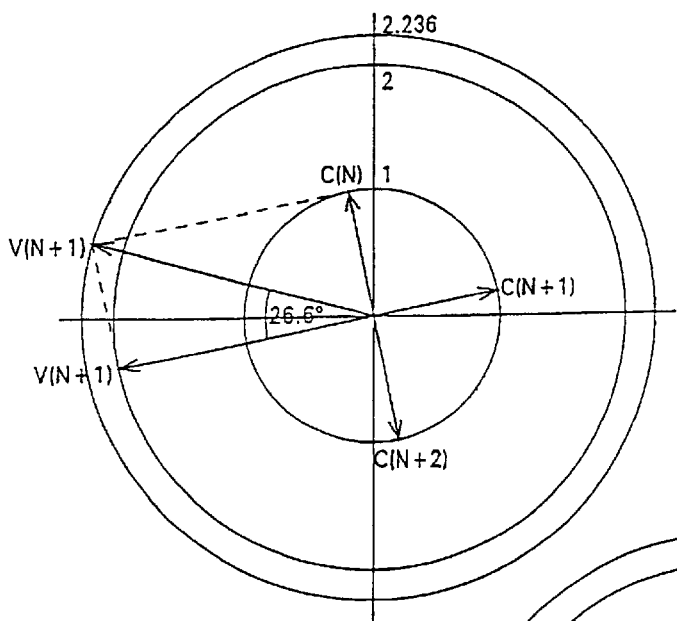
FIGS. 5 and 6 are phase diagrams used to explain the operation of the apparatus.

Referring to FIG. 5, during the period T1 to Ta, C(N), C(N+1) and C(N+2) are of equal amplitude, say unity, and mutually lagging by $\pi/2$ radians. Therefore, V(N+1) has an amplitude of 2 which is n radians out of phase from C(N+1). During the period Ta to Tb, the amplitude of C(N+2) has become zero, and therefore the amplitude of V(N+1) increases to $2 \times (5/4)^{1/2}$, that is by a factor of 1.118 compared with the previous amplitude of V(N+1), and its phase retards by $\tan^{-1}\frac{1}{2}$, that is 26.6°, compared with its phase during the period T1 to Ta. During the period Ta to Tb, the amplitude of C(N) has also become zero, and so the amplitude and phase of V(+1) revert to the same as during the period T1 to Ta. During the period Tc to T2, the amplitude of C(N+1) has also become zero, and therefore V(N+1) becomes zero.

Figure 6:
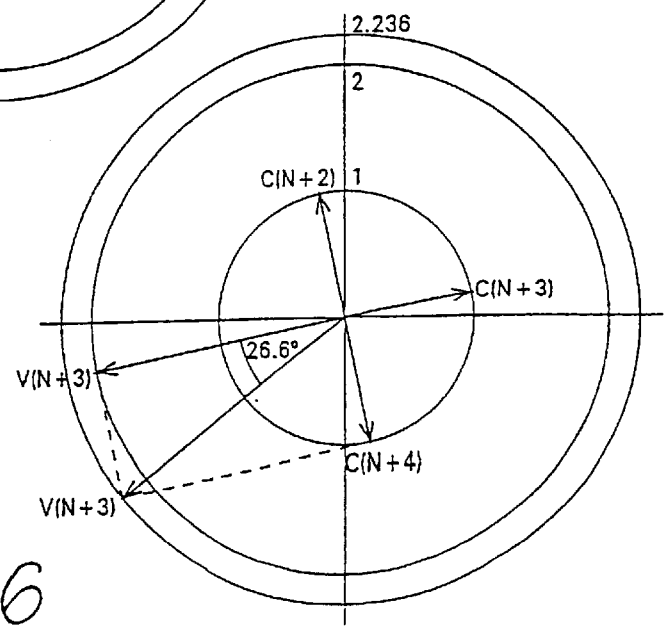

Referring to FIG. 6, during the period T1 to Ta, C(N+2), C(N+3) and C(N+4) are of equal amplitude, say unity, and mutually lagging by $\pi/2$ radians. Therefore, V(N+3) has an amplitude of 2 which is $\pi$ radians out of phase from C(N+3). During the period Ta to Tc, the amplitude of C(N+2) has become zero, and therefore the amplitude of V(N+3) increases to $2\times(5/4)^{1/2}$, that is by a factor of 1.118 compared with the previous amplitude of V(N+3), and its phase advances by $\tan^{-1}\frac{1}{2}$, that is 26.6°, compared with its phase during the period T1 to Ta. During the period Tc to T2, the amplitude of C(N+4) has also become zero, and so the amplitude and phase of V(N+3) revert to the same as during the period T1 to Ta It will be appreciated that many modifications and developments may be made to the embodiment of the invention as described above.

Figure 7:
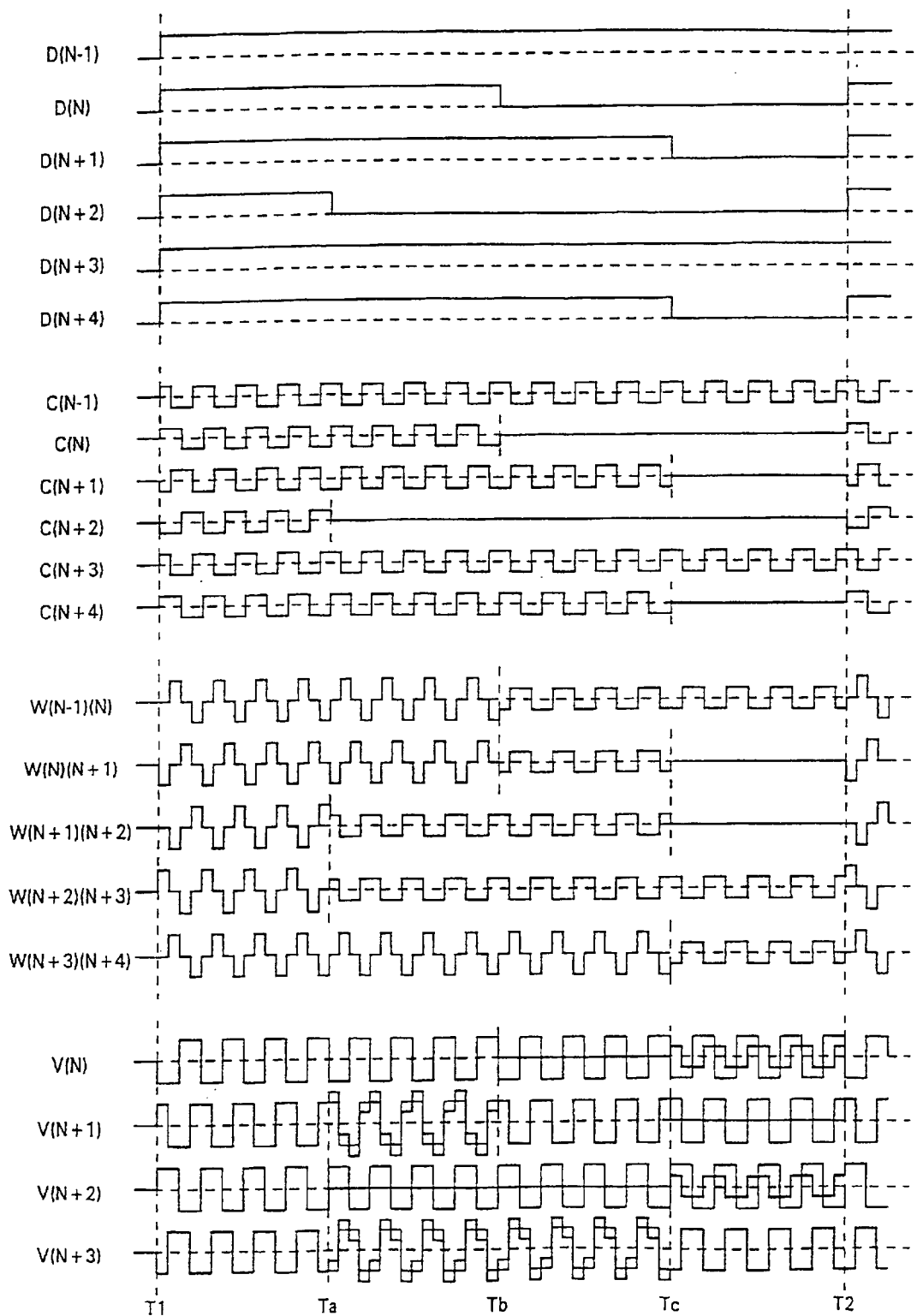
FIG. 7 is similar to FIG. 4, but illustrates a case where square-wave waveforms are used.

For example, waveforms other than sinusoidal waveforms may be used, for example square waveforms, as shown in FIG. 7, in which the inputs on line D are the same as in FIG. 4. Points of note in FIG. 7 are the volume changes V(N+1) during the second quarter of the cycle in the channel 16(+1), and the volume changes V(N+3) during the second and third quarters of the cycle in the channel 16(N+3). Here, the waveforms are no longer square, but have portions removed from some parts of the waveform and added on elsewhere. It will be appreciated, however, the apparatus can be constructed so that these irregular waves are sufficient to cause droplet ejection.

In the embodiments described above, the channels 16 are grouped in fours, and signals are applied which are phase-shifted by $\pi/2$ radians. Alternatively, the channels 16 may be grouped in larger groups, for example in groups of five or six, in which case the signals which are applied may be phase-shifted by $2\pi/5$ or $\pi/3$ radians. As a generality, the phase difference between the signals for adjacent channels is $2\pi n/X$ where n is an integer. So far, the description has assumed that n=1, but for other values of n different phase relationships may be obtained. The following table of examples illustrates the principle:

| | | Relative channel signal phase as fraction of $2\pi$ | | | | | | | |
|---|---|---|---|---|---|---|---|---|---|
| n | X | 1 | 2 | 3 | 4 | 5 | 6 | 7 | 8 |
| 1 | 5 | 0 | 1/5 | 2/5 | 3/5 | 4/5 | 0 | | |
| 2 | 5 | 0 | 2/5 | 4/5 | 1/5 | 3/5 | 0 | | |
| 1 | 6 | 0 | 1/6 | 2/6 | 3/6 | 4/6 | 5/6 | 0 | |
| 2 | 6 | 0 | 2/6 | 4/6 | 0 | 2/6 | 4/6 | 0 | |
| 1 | 7 | 0 | 1/7 | 2/7 | 3/7 | 4/7 | 5/7 | 6/7 | 0 |
| 2 | 7 | 0 | 2/7 | 4/7 | 6/7 | 1/7 | 3/7 | 5/7 | 0 |
| 3 | 7 | 0 | 3/7 | 6/7 | 2/7 | 5/7 | 1/7 | 4/7 | 0 |
| 4 | 7 | 0 | 4/7 | 1/7 | 5/7 | 2/7 | 6/7 | 3/7 | 0 |

As can be seen for n=2, X=6 the effect is the same as for n=1, X=3. In other words if n and X have a common factor the effect is the same as if that factor is cancelled from n and X. By choosing n≠1, with no common factor, the phase relationship between adjacent channels of a group can be changed without affecting the grouping of the channels as a whole. In practice n is chosen to be less than X. For n greater than X, patterns for n<X are merely repeated Temperature compensation techniques may be employed, for example as described in patent applications GB 9605547.0 and PCT/GB97/00733.

Each feature disclosed in this specification, including in the claims, and/or shown in the drawings may be incorporated in the invention independently of other disclosed and/or illustrated features.

What is claimed is:

1. A method of operating a drop-on-demand multi-tone printing apparatus having a series of channels arranged to receive ink from a source, each channel having a respective ink outlet, each pair of adjacent channels being separated by a respective dividing wall, and each dividing wall being movable in response to a respective wall signal comprising a first pulsed electrical signal to apply pressure pulses to the ink in the respective pair of the channels, whereby ink can be ejected from the outlets and deposited onto a recording medium, the method comprising the steps of:

developing for each channel a respective channel signal comprising a second pulsed electrical signal in dependence upon whether ink is to be ejected from that channel, the channel signals for pairs of adjacent channels temporally overlapping each other and not being in phase with each other; and applying to each dividing wall as said wall signal a combination of the respective channel signals developed for the said pair of channels, the wall signals respectively applied to the walls bounding a channel together causing droplet ejection when the channel signal for that channel so requires.

2. A method as claimed in claim 1, wherein the channels are arranged in groups each containing a number X of the channels (X≧3), the channel signals developed for pairs of adjacent channels being generally $2\pi n/X$ radians out of phase with each other, where n is an integer not equal to X.

3. A method as claimed in claim 2, wherein the number X is four.

4. A method as claimed in claim 1, wherein for each dividing wall, the wall signal comprises the combination of:

the channel signal developed for the channel to one side of that dividing wall and applied to an electrode on that side of the dividing wall; and the channel signal developed for the channel to the other side of that dividing wall and applied to an electrode on that other side of the dividing wall.

5. A method as claimed in claim 1, wherein:

lines of pixels of the ink are deposited onto the recording medium in respective cycles; and in each cycle, those of the channels which are to eject ink in that cycle begin ejection at the beginning of the cycle and continue ejection until part-way through, or the end of, the cycle.

6. A method as claimed in claim 1, wherein the channel signals developed for each channel are generally square-wave signals.

7. A method as claimed in claim 1, wherein the channel signals developed for each channel are generally sinusoidal.

8. A drop-on-demand multi-tone printing apparatus, comprising:

a series of channels arranged to receive ink from a source, each channel having a respective ink outlet, each pair of adjacent channels being separated by a respective dividing wall, and each dividing wall being movable in response to a respective wall signal comprising a first pulsed electrical signal to apply pressure pulses to the ink in the respective pair of the channels, whereby ink can be ejected from the outlets and deposited onto a recording medium;

means for developing for each channel a respective channel signal comprising a second pulsed electrical signal in dependence upon whether ink is to be ejected from that channel, the channel signals for pairs of adjacent channels temporally overlapping each other and not being in phase with each other; and means for applying to each dividing wall as said wall signal a combination of the respective channel signals developed for the said pair of channels, the wall signals respectively applied to the walls bounding a channel together causing droplet ejection when the channel signal for that channel so requires.

9. Apparatus as claimed in claim 8, wherein the channels are arranged in groups each containing a number X of the channels (X≧3), the channel signals developed for pairs of adjacent channels being generally 2πn/X radians out of phase with each other, where n is an integer not equal to X.

10. Apparatus as claimed in claim 9, wherein the number X is four.

11. Apparatus as claimed in claim 8 wherein, for each dividing wall, the means for applying the combination of channel signals comprises:

means for applying the channel signal developed for the channel to one side of that dividing wall to an electrode on that side of the dividing wall; and means for applying the channel signal developed for the channel to the other side of that dividing wall to an electrode on that other side of the dividing wall.

12. Apparatus as claimed in claim 8 wherein:

The channel signals are such that in operation lines of pixels of the ink are deposited onto the recording medium in respective cycles; and in each cycle, those of the channels which are to eject ink in that cycle begin ejection at the beginning of the cycle and continue ejection until part-way through, or the end of, the cycle.

13. Apparatus as claimed in claim 8, wherein the channel signals developed for each channel are generally square-wave signals.

14. Apparatus as claimed in claim 8, wherein the channel signals developed for each channel are generally sinusoidal.

* * * * *